United States Patent
Babacan et al.

(10) Patent No.: US 9,881,202 B2
(45) Date of Patent: Jan. 30, 2018

(54) PROVIDING VISUAL EFFECTS FOR IMAGES

(71) Applicant: Google Inc., Mountain View, CA (US)

(72) Inventors: Sevket Derin Babacan, San Francisco, CA (US); Aravind Krishnaswamy, San Jose, CA (US)

(73) Assignee: Google LLC, Mountain View, CA (US)

( * ) Notice: Subject to any disclaimer, the term of this patent is extended or adjusted under 35 U.S.C. 154(b) by 693 days.

(21) Appl. No.: 14/273,399

(22) Filed: May 8, 2014

(65) Prior Publication Data

US 2014/0341425 A1     Nov. 20, 2014

Related U.S. Application Data

(60) Provisional application No. 61/823,359, filed on May 14, 2013.

(51) Int. Cl.
| | |
|---|---|
| *G06K 9/00* | (2006.01) |
| *G06T 5/00* | (2006.01) |
| *G06T 11/60* | (2006.01) |

(52) U.S. Cl.
CPC .......... *G06K 9/00228* (2013.01); *G06T 5/008* (2013.01); *G06T 11/60* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,282,317 B1* | 8/2001 | Luo ................... | G06K 9/00234 382/203 |
| 7,035,477 B2 | 4/2006 | Cheatle | |
| 7,352,912 B2* | 4/2008 | Eschbach .......... | G06K 9/00624 382/176 |
| 7,492,921 B2* | 2/2009 | Foote ................ | G06F 17/30247 382/100 |
| 7,715,596 B2* | 5/2010 | Gehlen ................. | G06K 9/036 382/112 |
| 8,331,715 B2 | 11/2012 | Steinberg et al. | |
| 8,385,609 B2 | 2/2013 | Piramuthu et al. | |
| 8,780,262 B2* | 7/2014 | Kaida .................. | H04N 5/2351 348/222.1 |
| 8,970,731 B2* | 3/2015 | Song .................... | H04N 5/2353 348/229.1 |

(Continued)

OTHER PUBLICATIONS

Philpott, Eric, "Adding Atmosphere with Vignettes," Moving Colors The Adobe SpeedGrade Blog, http://blogs.adobe.com/movingcolors/2012/08/29/adding-atmosphere-with-vignettes/, Aug. 29, 2012.

(Continued)

*Primary Examiner* — Nancy Bitar
(74) *Attorney, Agent, or Firm* — IP Spring

(57) ABSTRACT

Implementations relate to providing visual effects for images. In some implementations, a method includes detecting one or more objects in an image. The method identifies one or more important objects of the objects, where the important objects are determined to have an importance measurement satisfying a predetermined threshold indicating their importance to a viewer of the image. The method determines an application of a visual image effect to the image based on the important objects.

14 Claims, 9 Drawing Sheets

(56) References Cited

U.S. PATENT DOCUMENTS

| | | | |
|---|---|---|---|
| 9,542,734 B2* | 1/2017 | Kimura | H04N 5/20 |
| 2003/0128877 A1* | 7/2003 | Nicponski | G06K 9/6269 |
| | | | 382/224 |
| 2004/0252286 A1 | 12/2004 | Kopcienski et al. | |
| 2005/0220363 A1* | 10/2005 | Oldroyd | G01C 11/00 |
| | | | 382/294 |
| 2006/0153456 A1* | 7/2006 | Foote | G06F 17/30247 |
| | | | 382/190 |
| 2006/0215924 A1* | 9/2006 | Steinberg | G06K 9/00228 |
| | | | 382/254 |
| 2007/0177050 A1* | 8/2007 | Xiao | G03B 7/091 |
| | | | 348/371 |
| 2010/0254612 A1* | 10/2010 | Oldroyd | G01C 11/00 |
| | | | 382/209 |
| 2012/0224783 A1 | 9/2012 | Chen et al. | |
| 2013/0108168 A1 | 5/2013 | Ptucha | |

OTHER PUBLICATIONS

European Patent Office (ISA); International Search Report and Written Opinion corresponding PCT/US2014/037382; dated Dec. 18, 2014; 13 Pages.

International Bureau of WIPO, International Preliminary Report on Patentability for International Patent Application No. PCT/US2014/037382, Nov. 17, 2015, 8 pages.

* cited by examiner

PROVIDING VISUAL EFFECTS FOR IMAGES

CROSS-REFERENCE TO RELATED APPLICATIONS

This application claims priority to U.S. Provisional Application No. 61/823,359, filed May 14, 2013, and which is incorporated herein by reference in its entirety.

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. In addition, some users like to apply particular visual effects to images by manipulating the image via software. Some examples of these types of effects are border effects, which manipulate the pixels near the borders of the images. For example, one such border effect is a vignette, which adds a gradual darkening effect to an image in a direction from the center toward the image borders. This effect can be used artistically to focus attention toward the center image areas inside the vignette border and/or as a frame for the image.

SUMMARY

Implementations of the present application relate to providing visual effects for images. In some implementations, a method includes detecting one or more objects in an image. The method identifies one or more important objects of the objects, where the important objects are determined to have an importance measurement satisfying a predetermined threshold indicating their importance to a viewer of the image. The method determines an application of a visual image effect to the image based on the important objects.

Various implementations and examples of the method are described. For example, the objects can be faces and the important objects can be important faces. The method can further include, in response to identifying multiple important objects in the image, determining a distance between outermost important objects, and determining whether to apply the visual image effect to the image based on the distance between the outermost important objects. The method can include determining a center of the visual image effect to be applied, where the center is based on the position of the important objects in the image. For example, the center of the visual image effect can be a mean center of all the important objects. The method can further include applying the visual image effect to the image centered on the determined center. In some implementations, the visual image effect can be a border effect provided near the borders of the image and centered on the determined center of the border effect. The method can determine a radius around the center in which the border effect is not to be applied. The method can determine a strength of the border effect and a radius of the border effect to be applied to enhance the quality of the image. In some examples, the visual image effect can be a vignette.

The importance measurement can include a determination of whether an object has a size greater than a predetermined size, where the predetermined size is based on a size of the image, and/or can include a determination of whether an object has a sharpness over a predetermined threshold sharpness. The method can determine a strength of darkening of the visual effect, and in some implementations the strength of the darkening can be based on a location of one of more of the important objects in the image, a combined size of the important objects in the image, and/or the number of the important objects in the image.

A method includes, in some implementations, detecting one or more objects in an image and identifying one or more important objects of the objects. The important objects are determined to have an importance measurement satisfying a predetermined threshold indicating their importance to a viewer of the image. The method determines a center of a visual border effect to be applied to the image, where the center is based on the position of the one or more important objects in the image, and where the border effect is to be applied in greater strength closer to the borders of the image than to the determined center of the border effect. The method applies the visual border effect to the image centered on the determined center. In various implementations, the center of the visual image effect can be a mean center of all the important objects. In response to identifying multiple important objects, the method can determine a distance between outermost important objects, and determine whether to apply the visual border effect to the image based on the distance between the outermost important objects.

In some implementations, a system can include a storage device and at least one processor accessing the storage device and operative to perform operations. The operations include detecting one or more objects in an image and identifying one or more important objects of the objects, where the important objects are determined to have an importance measurement satisfying a predetermined threshold indicating their importance to a viewer of the image. The operations further include determining an application of a visual image effect to the image based on the one or more important objects. In various implementations, in response to identifying multiple important objects in the image, an operation can include determining a distance between outermost important objects and determining an application of the visual image effect can include determining whether to apply the visual image effect to the image based on the distance between the outermost important objects. Determining an application of the visual image effect can include determining a center of the visual image effect to be applied, where the center is based on the position of the important objects in the image.

DETAILED DESCRIPTION

Figure 1:
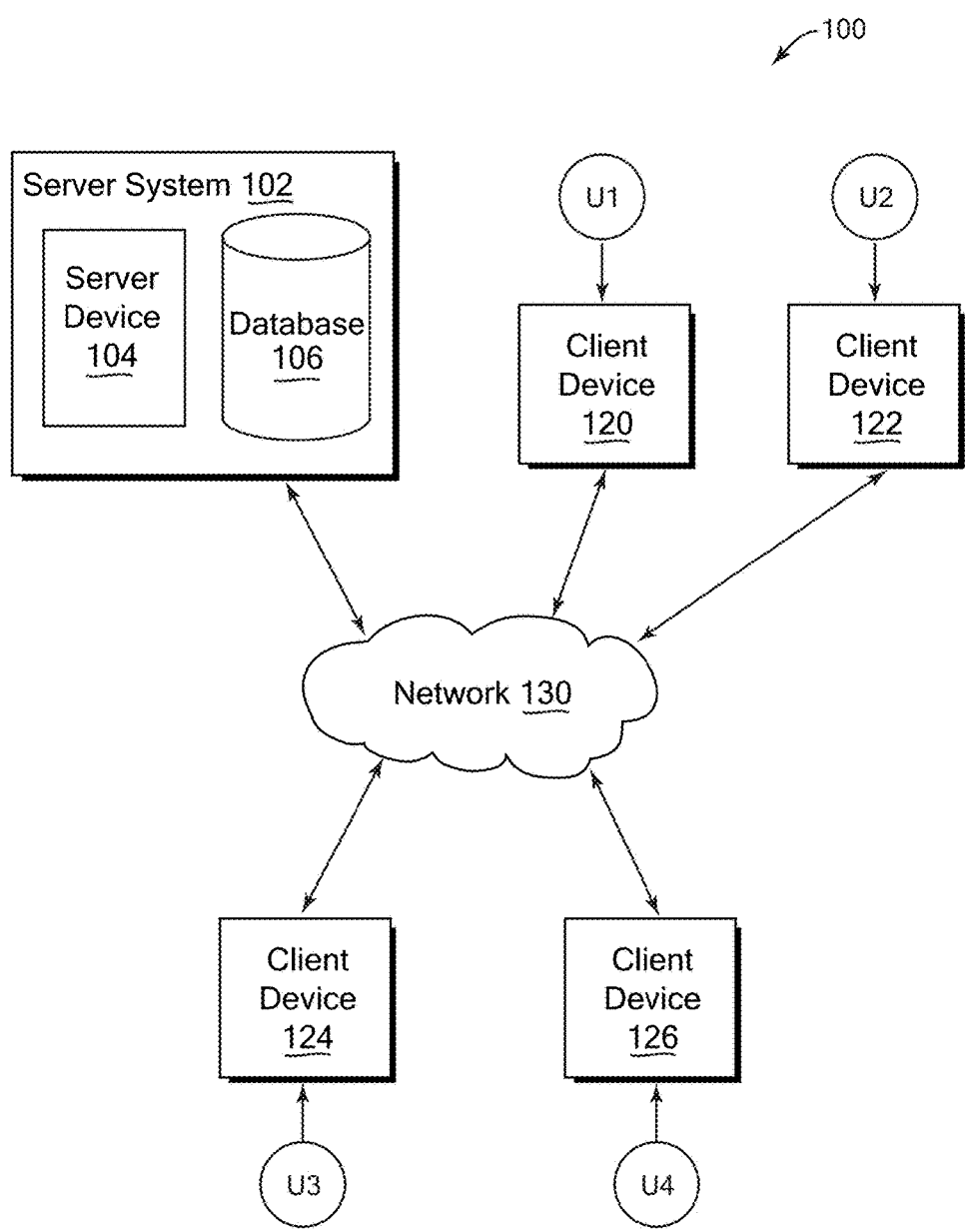
FIG. 1 is a block diagram of an example network environment which may be used for one or more implementations described herein.

Implementations described herein relate to providing visual effects for images. In some implementations, a system can detect one or more objects in an image. The system identifies one or more of the detected objects as important objects, where the important objects have an importance measurement satisfying a predetermined threshold indicating their importance to a usual viewer of the image. The system determines an application of the visual image effect to the image based on the important objects.

For example, in some implementations, in response to identifying multiple important objects in the image, the system can determine a distance between outermost important objects, and can determine whether to apply a visual image effect to the image based on the distance between the outermost important objects. If the visual image effect is to be applied, the system determines a center of the visual image effect, where the center is based on the position of the one or more important objects. In various implementations, the objects can be faces depicted in the image. Furthermore, the visual image effect can be a border effect, such as a vignette. Additional features include determining a strength of the border effect and a radius of the border effect to enhance the quality of the image.

Described features can allow effective automated visual effects to be applied in images. For example, the system can automatically determine whether to apply a visual effect such as a vignette or other border effect by finding important objects (such as faces) in the image and checking whether such objects are located appropriately to allow the visual effect to be applied or whether to refrain from applying the effect. If a visual effect is to be applied, important objects can be used to help determine and/or adjust characteristics or parameters of the applied visual effect. The system can automatically find the center of where a visual effect should be applied, such as the center of a vignette, and can avoid applying the effect in a way that would obscure one or more of the important objects in the image. Further features allow the strength and radius of border effects to be automatically determined for enhancing the image quality and avoiding degrading the image with the visual effect. The user can therefore avoid tedious manual examination and adjustment of each image to apply visual effects to the images. Thus, a technical effect of applying visual effects as disclosed herein includes a reduction in user time applying such visual effects, thus saving a user time, energy, and resources. Another technical effect is a higher quality in image appearance resulting from consistent application of visual effects across many images associated with the user. Thereby, the intent to improve the quality of image appearance resides, in part, in achieving an aesthetic effect, but also in enhancing the recognition capabilities of a user as follows: Another effect of the described features is that a user's ability of performing visual recognition of important objects in the image is enhanced through applying the visual effects to the image as described herein. This means that a user can perform a task of identifying important objects in an image more quickly and with less effort after the visual effects are applied to the image. The application of visual effects according to the present application is thus to be considered as a technical tool for assisting and improving the task to be performed by the user and a technical solution to the technical problem of efficient identification of important objects in an image through a user.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, wearable device, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via a social network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
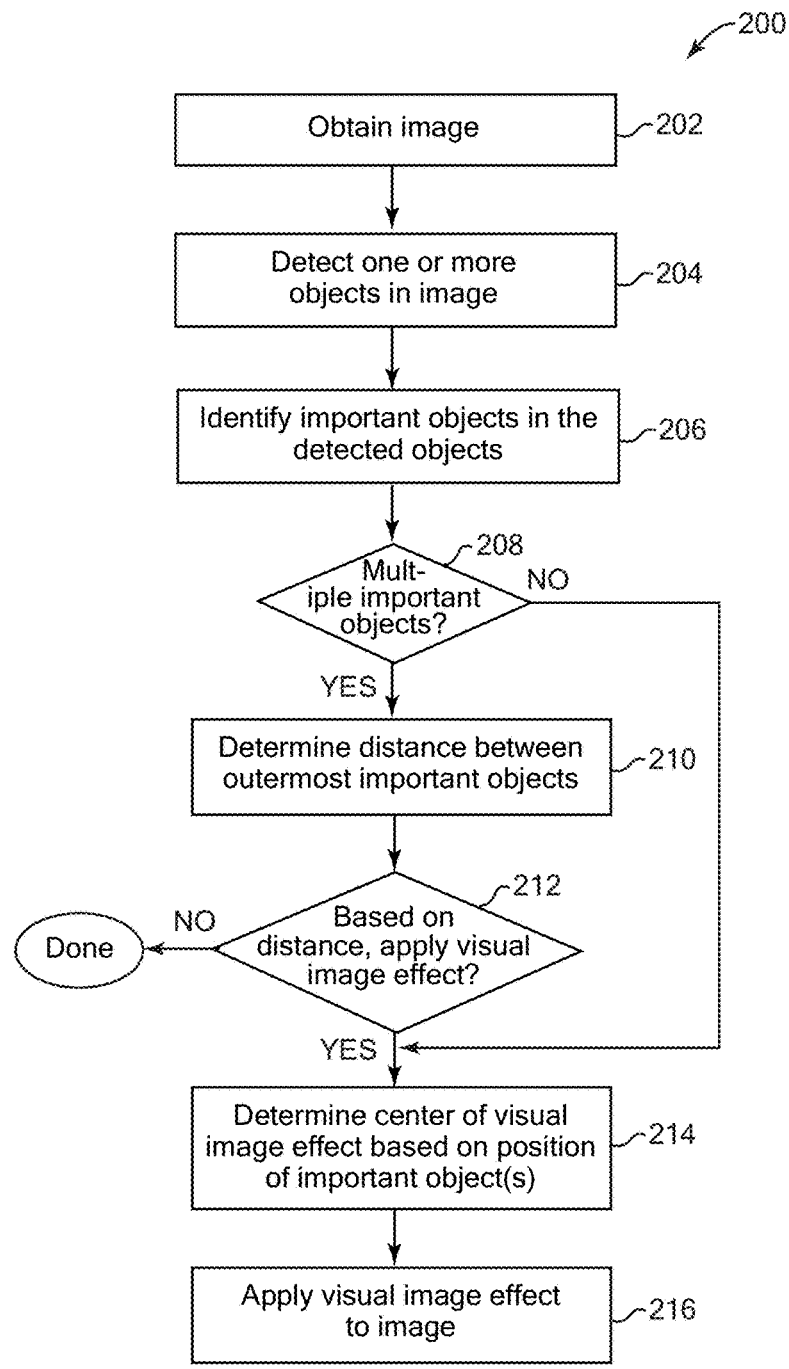
FIG. 2 is a flow diagram illustrating an example method for providing visual image effects for images, according to some implementations.

FIG. 2 is a flow diagram illustrating one example of a method 200 for providing visual image effects for images. In some examples, method 200 can be implemented on a server system 102 as shown in FIG. 1. In other examples, some or all of the method 200 can be implemented on a system such as one or more client devices, and/or on both a server system and a client system. In described examples, the system includes one or more digital processors or processing circuitry ("processors"), and one or more storage devices such as a database 106 or other storage. In some implementations, different components of one or more servers and/or clients can perform different blocks or other parts of the method 200. Method 200 can be implemented by computer program instructions or code, which can be executed on a computer, e.g., implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by a system. For example, the method can be periodically performed, or performed based on a particular event such as one or more original images being newly uploaded to or accessible by the system, or a condition specified in custom preferences of one or more users of the system. In one non-limiting example, a camera, cell phone, or other portable client device can capture an image and can perform the method 200. In addition or alternatively, the device can send a captured image to a server over a network, and the server can process the image using method 200. Some implementations can initiate method 200 based on user input. A user may, for example, have selected the initiation of the method 200 from an interface such as a social networking interface, application interface, or other interface.

In operation 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image from an album or other collection of multiple images, such as an album provided in an account of a user of a social networking system or other storage collection. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In operation 204, the method detects one or more objects in the image. In various implementations, the objects can be detected by the method 200, or the detections can be determined by a different process or system and provided to the method 200. The objects can be detected, for example, using any object recognition technique. In some example implementations, faces can be detected as the objects using any facial recognition technique. For example, some facial recognition techniques check for facial features and landmarks such as eyes, mouth, etc., to identify faces, and/or check for skin tones and other characteristics. In some implementations, the particular identities associated with the detected faces are not or need not be determined, while in other implementations the method has access to identity information and can match identities to detected faces.

Other objects besides faces can also be identified in some implementations. For example, objects can be detected by finding edges within the image, e.g., areas of the image where the brightness and/or color changes rapidly within a small pixel distances. Any of a number of different edge detection techniques can be used. The detected edges can be examined and if several edges are determined to be grouped together in a particular area of the image, such a grouping can be considered an object. Other object detection techniques can be used in other implementations.

In operation 206, the method identifies which of the detected objects are important objects. "Important objects" or "focal objects" as referred to herein are objects depicted in the image that are determined to be important to a viewer of the image (such as an average user viewer of the image), e.g., the object(s) which typically get the main attention and focus of the viewer. In some implementations, important objects can be identified based on an importance measurement. For example, if the importance measurement is over (e.g., satisfies) a predetermined threshold, the object is considered to be important enough to be considered an important object. The importance measurement can be based on a variety of different characteristics of the objects, some examples of which are described below with respect to FIG. 3. Herein, the terminology "over a threshold" indicates that a measurement or value has "crossed" the threshold, e.g., has met or satisfied that threshold, and does not necessarily indicate that the measurement or value has a higher value than the threshold value. For example, in some implementations, a value lower than a threshold may satisfy that threshold.

In operation 208, the method checks whether multiple important objects were identified in operation 206. If not, the method continues to operation 214, described below. If multiple important objects were identified, then in operation 210 the method determines a distance between the outermost important objects in the image. In some implementations, the outermost important objects are those important objects furthest from the center of the image on approximately opposite sides of the center point of the image, some examples of which are described below for FIG. 3.

In operation 212, the method checks whether to apply a visual image effect to the image based on the distance determined in operation 210. The visual image effect can be any of many possible image effects that visually change one or more portions of the image. In some implementations, the visual image effect is a "border effect" or "periphery effect" that changes the image primarily in a periphery area near one or more image borders. For example, a vignette is a border effect that affects the brightness value of pixels, and can gradually darken the periphery areas of the image around a center region in a direction from the center of the image to the borders of the image. Other types of border effects can include altering periphery areas of the image near the borders with other visual changes, such as changes to brightness, color, patterns, textures, etc. of the image. Other types of visual effects can affect only a center region and not affect the periphery areas around the center, such as particular enhancements to an area centered on the center point of the image, e.g., edge contrast enhancement, change of brightness and/or color, addition of pattern or texture, etc. In some implementations, multiple types of visual image effects can be checked whether to be applied to the image.

In some implementations of operation 212, the determined distance is compared to a predetermined distance threshold, and if the distance is greater than the threshold, no visual effect is applied. A longer distance between important objects in such cases, such as higher than the distance threshold, can indicate the main subjects of interest of the image are far enough apart so as to make the visual image effect undesirable. In some examples, the longer distance may indicate that one or more important objects are within a periphery area of the image, e.g., close to a border. For example, if the visual image effect is a border effect such as a vignette, then periphery areas of the image may be adjusted by the visual effect which could also adjust the outermost important objects, which can be undesirable. Thus, in images having far apart important objects, the visual image effect is not applied, and the method ends.

If the method determines in operation 212 that the distance between the important objects as determined in operation 210 is small enough, e.g., under the predetermined distance threshold, then the visual image effect can be applied. If so, the method continues to operation 214, in which the method determines a center of the visual image effect to be applied. This effect center is based on the position of the important objects in the image. In one non-limiting example, each important object can have its center determined, and the visual effect center is then determined as the mean or other average of the centers of all the important objects.

In operation 216, the method applies the visual image effect to the image. The visual effect is applied based on the center determined in operation 214. For example, a border effect such as a vignette can be centered on the determined center such that a lowering of the brightness of pixels radiates from that center. In some examples, the darkening (or other border effect) is applied in greater strength closer to the borders of the image than to the determined center of the border effect. Other effects can also or alternatively be applied to the image based on the determined center. In some implementations, other parameters besides the effect center can be determined to adjust or specify the application of the visual image effect, and some examples of such parameters are described below with reference to FIG. 3.

Figure 3:
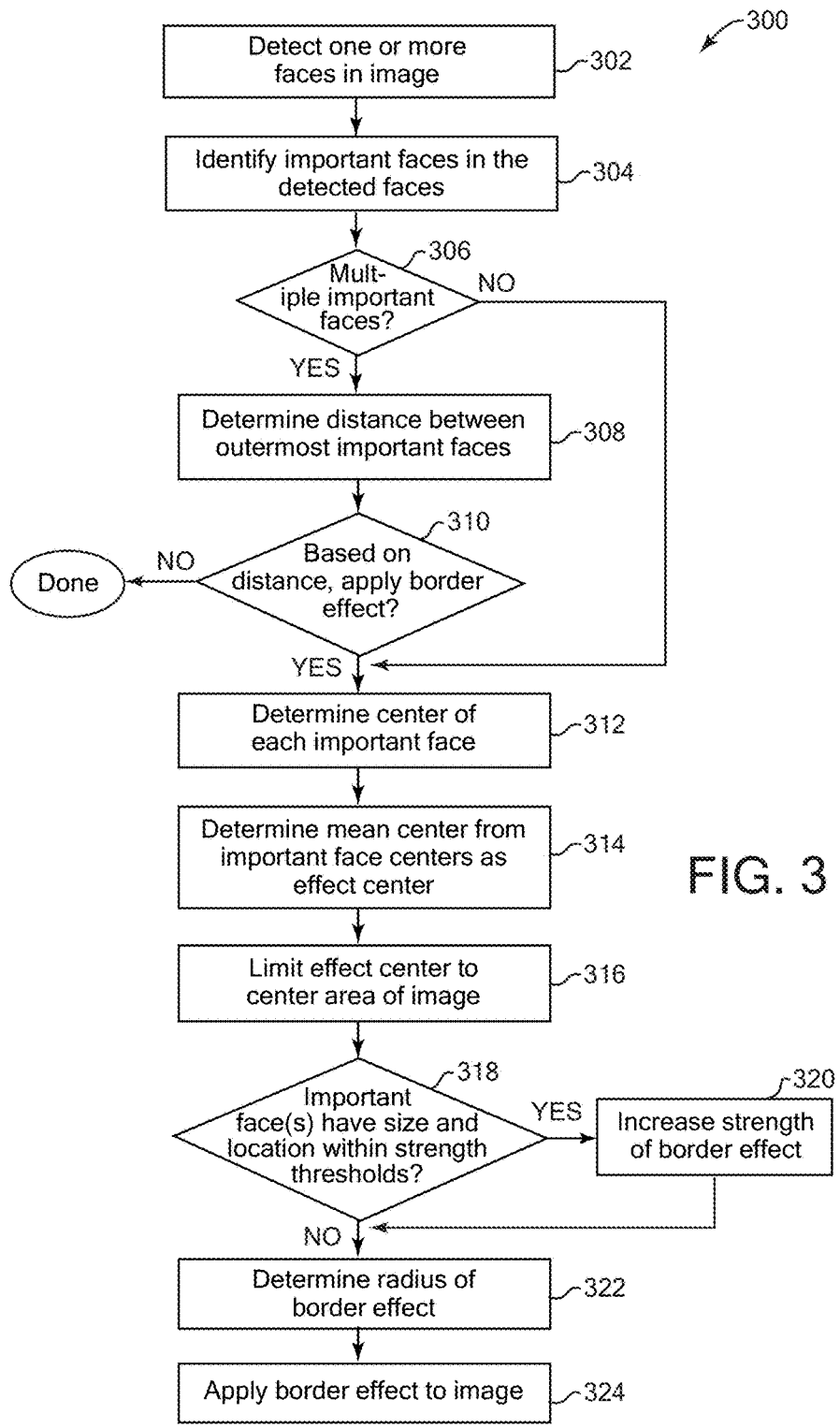
FIG. 3 is a flow diagram illustrating another example method for providing visual image effects for images, according to some implementations.

FIG. 3 is a flow diagram illustrating another example method 300 for providing visual image effects for images, according to some implementations. Method 300 can be implemented by a system such as a server and/or client device as described above for method 200 and initiated similarly as described for method 200. In the particular example of FIG. 3, the visual effect is a border effect and faces are detected as the objects in the image. Other implementations can additional or alternatively detect other types of objects (articles, animals, vehicles, landscape objects or regions, etc.). Although border effects are described in the example of method 300, the method 300 can also apply other types of visual image effects as described above for FIG. 2.

In operation 302, the method can obtain an image similarly as described above in FIG. 2 and detects one or more faces in the image. In some example implementations, the faces are detected by a facial recognition technique or facial recognizer as described above. For example, the facial recognizer can locate the faces in the image and provide a face polygon, such as a rectangle or other shape, that approximately surrounds each face detected in the image or surrounds particular facial features such as eyebrows, eyes, and mouth.

In operation 304, the method identifies which of the detected faces are important faces. Similarly as described above for FIG. 2, the important faces can be determined based on an importance measurement made for each of the faces. In some implementations, if an importance measurement satisfies a predetermined threshold, the associated face is considered to be important enough to be a important face. The importance measurement can be based on a variety of different characteristics of the faces.

In some implementations, the importance measurement can be based on the size of the faces. In some implementations, the size of the face is determined from face polygons provided by a facial recognizer indicating the size and location of the faces. For example, detected faces having a size greater than a predetermined threshold size are considered to be important faces and are collected in a group of important faces of the image. This allows large faces appearing in the image (e.g., faces positioned closer to a camera lens capturing the image) to be considered important, since smaller faces as appearing in the image are not as likely to draw the attention of a viewer of the image. In some implementations, the predetermined threshold size can be based on or be relative to the image size. For example, a larger image size will cause the threshold size to be correspondingly larger, since the size of the face should be large proportional to the entire image area to draw the viewer's attention.

Some implementations can alternatively or additionally examine the detected faces for sizes lower than a size threshold, and discard those faces from the group of important faces (or never add those faces to that group). For example, faces that are lower than the predetermined size threshold or are smaller than the largest detected face size by a predetermined threshold amount can be discarded from a list of important faces for the image. In some non-limiting examples, very small faces (e.g., below a lower threshold size) are filtered out, the remaining faces are ordered according to their size, and the method designates important faces as those remaining faces that are within a predetermined threshold (e.g., threshold percentage) of the largest-sized remaining face.

In some implementations, the importance measurement can be based on a sharpness of the face, where detected faces having a sharpness over a predetermined threshold sharpness are considered to be important faces. This allows clear, in-focus faces to be considered important and blurry or out-of-focus faces in the image less important, since such blurry faces are more likely to be part of the background of the image and may not be as likely to draw the attention of a viewer of the image. Sharpness of objects such as faces can be measured using any of a variety of techniques, e.g., edge detection, contrast differences, etc.

Some implementations can utilize one or more other quality measurements of the detected faces to indicate importance. For example, particular colors, contrasts, or other characteristics of faces can be used. Various implementations can combine two or more of these measurements into an overall importance measurement. For example, a detected face can be considered an important face if it meets both a size threshold and a sharpness threshold. In some implementations, a face can be considered important if it meets one or more thresholds and misses one or more other thresholds, e.g., by particular predetermined low amounts. Some implementations can also rank or assign weights to different importance thresholds and can sum the different ranks or weights to a total score that can be compared to a threshold. In this way, a face can be found to be important if few high-ranking thresholds are met, or if a larger number of low-ranking thresholds are met, etc.

In operation 306, the method checks whether multiple important faces were identified in operation 304. If not, the method continues to operation 312, described below. If multiple important faces were identified, then in operation 308 the method determines a distance between the outermost important faces in the image. In some implementations, the outermost important objects are those important faces furthest from the center of the image on approximately opposite sides of the center point of the image. For example, the left-most important face in the image (e.g., the important face having the left-most horizontal coordinate, or having a left-most center of the face) and the right-most important face in the image (e.g., the important face having the right-most horizontal coordinate or right-most center of the face) can be used to determine the distance in some implementations, or the top-most important face (relative to the top edge or border of the image) and the bottom-most important face (relative to the bottom edge or border of the image), diagonally-opposite important face, etc. In some implementations, the distance is scaled or normalized to the size of the image, or conveyed as a percentage distance of the image's total corresponding dimension.

In operation 310, the method checks whether to apply a border effect based on the distance determined in operation 308. The border effect can be an effect that changes a periphery area of the image primarily near one or more image borders, e.g., an effect that is applied in greater strength closer to the borders of the image than to the determined center of the border effect. For example, a vignette effect is a border effect that can gradually lower the brightness of pixels in periphery areas of the image around a center region in a direction from the center of the image to the borders of the image. Other types of border effects can include altering periphery areas of the image near the borders with other visual changes, such as changes to brightness, color, patterns, textures, etc. of the image. Other types of visual effects can be used in other or additional implementations.

In some implementations, the determined distance is compared to a predetermined distance threshold (e.g., scaled proportionally to the size of the image), and if the distance is greater than the threshold, no border effect is applied. A longer distance between important faces can indicate the main subjects of interest of the image are far enough apart so as to make the border effect undesirable. In some examples, the longer distance (e.g., greater than the threshold) may indicate that one or more important objects are within a periphery area of the image, e.g., close to an image border. For example, when the border effect is an effect such as a vignette, then periphery areas of the image may be darkened by the vignette which could also darken one or more of the outermost important faces, which can be generally undesirable. Thus, in the example method 300, in images having far apart important faces, the border effect is not applied, and the method ends. Overall, the method tries to avoid darkening or otherwise adjusting important faces or objects, in some implementations.

If the method determines in operation 310 that the distance between the important faces as determined is small enough, e.g., under a predetermined threshold, then the border effect is to be applied. The method continues to operation 312, in which the method determines a center of each important face. For example, the facial recognizer may have indicated the center of each face polygon provided by the recognizer. In some implementations, the method can determine the center of each face polygon or other defined area indicating a important face in the image.

In operation 314, the method determines a mean center based on the centers of the important faces. This mean center is the determined effect center for the border effect to be applied. For example, if a single important face was identified, then the center of this face is the center of the border effect. If multiple important faces were identified, then the center is averaged between the locations of the important faces so that the border effect will be applied centered around the most important areas of the image. In some implementations, an effect center is determined in operation 314 by determining a centroid of the important faces using the face areas as a weighting factor.

In operation 316, the method limits the effect center to a predetermined center area of the image. For example, the predetermined center area can be a predetermined center rectangle, or other shape in other implementations. In one example, the center rectangle can cover the center one-third of the image in each dimension, or can be other sizes in other implementations. This operation thus may adjust the effect center determined in operation 314 if the effect center is found to be too far from the image center. This prevents the applied border effect from being centered too far in one direction of the image, e.g., too far away from a center of the image (e.g., greater than a threshold distance), which may cause too much of the border effect to be applied on one side of the image. For example, a vignette may darken one side of the image too much relative to the opposite side of the image if the vignette is centered too far from the image center on that opposite side.

In operation 318, the method checks whether the important face(s) have a size and location within particular strength thresholds, which are predetermined thresholds determined to check whether the strength of the border effect should be adjusted. The strength is a parameter of the border effect that influences how strongly the effect is produced in the image, such as how darkly a vignette effect is applied. In some implementations, the strength of the border effect is first set at a default value. For example, the default value may have been tested in many sample images to be at a conservative strength level that applies the effect in a generally non-obtrusive way. Operation 318 then checks particular conditions that may apply in the image which can allow the border effect to be increased in strength from the default strength to achieve a more higher quality and more pronounced visual effect.

The strength thresholds tested can be any of a variety of thresholds. In some examples, one strength threshold can be a location threshold that defines a predetermined center area of the image that is centered on the image center. If the mean center of the important faces is provided within the predetermined center area, then the border effect strength can be adjusted. For example, the center area can be a rectangle centered on the image center and which extends more than one-half of the image size in each dimension. In some implementations, a size threshold can also be imposed as a strength threshold, where the combined area of the faces is checked whether it is greater than the size threshold to cause or allow border effect strength to be increased. Some implementations can require that the combined areas of the important faces be contained within a predetermined containment area of the image. For example, the containment area can be a rectangle centered on the image center and which extends horizontally over one half of the horizontal dimension of the image and extends vertically over 90% of the vertical dimension of the image. The horizontal dimension is more constrained in this example because that dimension is generally more important in preserving important faces. For example, applying border effects (such as vignette darkening) to the tops or bottoms of faces may not be as visually degrading to the image as applying the effects to the sides of faces. Some implementations can use a number threshold, where if the number of important faces is above the number threshold, then the strength of the border effect is not adjusted. In one example, the number threshold can be one, such that if multiple important faces are present, no strength adjustment is made.

In some implementations, if any of the strength thresholds are not met, then the method does not adjust the effect strength such that the default strength is used, and the method continues to operation 322, described below. In other implementations, there may need to be a certain number of thresholds unmet to disqualify strength adjustment. If the thresholds are met, then the method continues to operation 320, where the strength of the border effect is increased. For example, in a vignette effect, the amount of darkening to the image can be increased. In some implementations, the amount of increase can be a predetermined amount, such as 10%, while in other implementations the amount can be based on other image or face characteristics, such as a strength increase based on size of the combined area of the important faces, brightness of the important face areas or the image, color range of important face areas or image, the number of important faces, etc. In another example, a single important face in the image that covers a large portion of the image (e.g., over a threshold percentage) can be a special case that causes an increase to the effect strength. The method then continues to operation 322. In other implementations, the effect strength can be adjusted in other ways, e.g., decreasing strength based on meeting particular thresholds.

In operation 322, the method determines a radius of the border effect. The "radius" is the distance from the center that pixels start to be adjusted by the border effect (e.g., darkened by a vignette effect) and continue to be adjusted in directions toward the borders of the image. The radius parameter thus determines how much of the area of the image will be preserved and not affected by the border effect (or minimally effected by the border effect, e.g., below a minimum threshold). With border effects such as vignettes, this preserved area is typically near the center. The term "radius" is used herein, although the preserved area can be any of different shapes, such as circular, elliptical, rectangular, polygonal, etc. In some implementations, the radius can be determined such that the preserved area of the image is about 125% of the combined area (union) of all the important faces. Thus, the border effect can be started at a point from the effect center which preserves about 125% of the image surrounding the effect center, where the effect is not applied. In some implementations, a limit or lower bound can also be set on the smallest radius that can be set. This can prevent too large an area being affected by the border effect in the image, which may degrade image quality. For example, when providing a vignette effect, if the combined area of the important faces is small, then the vignette effect can start closer to the effect center, which can cause the borders and much of the periphery area of the image to be darker than desired. In such a case, the radius can be prevented from going below the predetermined lower limit so as to reduce or prevent the image borders from too much darkening.

In some implementations, the method can determine the radius by determining the union of the face areas (e.g., boxes or rectangles) of all the important faces. The maximum of the width/height of this union is the central region for the border effect (e.g., the region of the image where the border effect has no or minimal effect). Some implementations can also use a variance, where the method can bias the inclusion of each face's area into the union depending on the size of the face, such that larger face areas are favored for inclusion in the union.

In operation 324, the border effect is applied to the image using the center, strength, and radius parameters described above. In some examples, the border effect can be or include a vignette, and a vignette function can be used to apply the effect. A vignette function can darken pixels according to an exponential function and/or circular function. In one example of a simple vignette function, the brightness scale can be set between values of 0 and 1, where 1 indicates no change to the pixel brightness and 0 indicates complete darkening of the pixel. The brightness scale for a pixel can be calculated using the distance of the pixel to the central circle (or ellipse) defined by the radius r. For example, the brightness scale of the pixel can equal the distance of the pixel to the ellipse (with center c and radius r) times the vignette strength. In some examples, the distance can be determined as the squared Euclidean distance (e.g., take squares of the differences of coordinates of pixels, sum them, and take the square root of the sum). Other distance determinations can alternatively be used. Furthermore, a variety of other vignette functions can be used in other implementations.

The implementations described above for FIG. 3 refer to detecting faces and important faces depicted in images. In other implementations, other types of depicted objects besides faces can be detected in images and processed similarly, as described above for FIG. 2. For example, in some implementations, a spatial variation map can be calculated to detect edges in the image and determine where the edges are clustered together to identify an object of importance in the image. Such objects can be processed similarly to the faces described above for method 300.

Features described above can automatically apply a visual effect to an image. For example, adjusting the creation of a visual effect by examining important objects (such as important faces) can greatly reduce the chances that any spurious, background, or otherwise non-essential objects in the image will throw off the creation and resulting appearance of the visual effect in the image.

Some implementations can also or alternatively detect in operation 310 (or at another stage or operation of method 300) whether one or more visual image effects have previously been applied to or exist in the image, and if such a previous effect is detected, avoid or reduce the application of a current visual image effect in method 300. For example, the method can check whether a previous vignette effect has already been applied to or is existing in the image. In some examples, such a previous visual effect may have been manually directed and applied to the image by a user, e.g., using image processing software on a device such as a camera, computer, etc. In other examples, a previous visual effect may be a natural effect existing in an image that was not separately added by a user, such as a darkening on the edges of a photo applied or produced from camera, lighting properties existing when the photo was captured, and/or the composition and layout of objects and features in the image.

Detecting a previous image effect can include, in one example, blurring the entire image one or more times using a blurring technique, which reduces or eliminates high-frequency details of the image (e.g., a large radius blur). The method can then examine the blurred image for brightness changes in the corners and borders vs. the center of the image, such brightness changes indicating a previous, existing vignette effect. For example, a brightness change greater than a predetermined threshold amount can be checked, where a vignette is considered detected if there is a change over the threshold. Other types of visual effects can also be checked. In some implementations, if one or more previously-applied vignettes (and/or other visual effects) are detected, then the method ends, e.g., via a negative result of operation 310.

In other implementations, if one or more previous visual effects are detected in the image, the method 300 can continue, but applies the current visual effect at a reduced strength, size, and/or other reduced or scaled-down parameters. Some implementations can detect the strength (and/or other characteristics) of the previous visual effect(s), and scale down the strength (and/or other parameters) of the current visual effect in accordance with the detected strength of the previous visual effect(s).

Some implementations can determine the strength of the current visual effect (e.g., border effect) using certain techniques instead of or in addition to the example effect strength determination and previous-effect detection described above, e.g., in operations 318 and 320. For example, effect strength determination can include checking for whether a previous visual effect exists in the image. In some examples, an effect score can be used to guide the effect strength that is applied. The effect score can indicate an approximation of how much a previous effect in the image exists or has been applied (e.g., an approximation of strength, such as brightness, of an existing vignette).

An effect score can be determined as follows in some implementations. The image can be resized to a canonical image size. In one non-limiting example, the canonical size can be a smaller size than the image, e.g., 100 pixels on the long edge or another size in other implementations. A blur can then be applied to the resized image, e.g., to remove high frequency details and cause pixel values (such as brightness) to mix. In one non-limiting example, a Gaussian blur having a large blur amount, such as 10 pixels, can be used, similarly as described above.

A Gaussian weighted mean of pixel values in the image can then be determined. For example, the pixel values can be brightness (luminance) of the pixels if detecting a vignette or other brightness-oriented visual effect. In one non-limiting example, a sigma ($\sigma$) of 4 can be used for the weighted mean. The center of the Gaussian weighting can be the center of the image. In other embodiments, the center of the Gaussian weighting can be determined similarly to an effect center as described above, e.g., based on the centers of the important objects identified in the image. For example, the center of Gaussian weighting can be the centroid of the set of important objects as determined in implementations above. A set of differences in pixel values can then be determined between corner or edge areas of the image and the weighted mean. For example, the brightness of each corner pixel of the blurred image can be subtracted from the weighted mean brightness (or vice versa), to obtain four difference results. The effect score for determining border effect strength can be the sum of these difference results. The sign of the score can indicate the sign of pixel values of any existing border effect relative to the mean pixel values in the image, e.g., whether any existing vignette is lighter or darker than the mean brightness.

In some implementations, the pixel values (e.g., brightnesses) of edge pixels other than or in addition to corner pixels can be used for the difference results, and/or an average of multiple corner and/or edge pixels at each corner or edge can be used. The difference results allow the method to sample differences in brightness (or other pixel value, e.g. color) between extreme border areas of the image and the weighted mean, thus indicating whether the border areas or periphery areas of the image are already dark (or light) compared to the mean pixel values in the image. For example, in some images in which there is a bright sky and dark ground, the upper two bright corner pixels can cancel out the lower two dark corner pixels, leaving an indication of no previous vignette, while all corners having similar brightness indicates a strong previous vignette.

Using the effect score, a visual effect strength can be determined. For example, a predetermined maximum effect strength can be selected. The method can interpolate an effect strength between this maximum strength and zero, based on the effect score. If the effect score magnitude is greater than (or otherwise satisfies) a predetermined threshold, then an existing visual effect has been detected such that no current visual effect is applied (or is applied in reduced strength). For example, in some vignette examples, if the effect score is over a particular predetermined magnitude, then a large difference in brightness value is indicated for the image corners or edges, and an existing vignette has been detected such that no current vignette is applied (or a reduced vignette is applied). In one example, if the effect score is greater than a positive threshold (e.g., indicating dark vignetting present in some implementations), the strength for a current vignette can be set to zero. Similarly, if the effect score is less than the same-magnitude negative threshold (e.g., indicating heavy "white vignetting" in similar implementations, where the center areas are darker than the border areas of the image), the strength can also be set to zero. For example, this can allow user-applied effects such as light-colored borders to avoid being changed by an applied darker vignette.

The results from such processing are robust and provide few undesired effects, even with images that have been processed by other processing software and/or effects. In some implementations, a visual effect score similar to the score described above can be used to adjust other characteristics or parameters of the visual effect being applied to the image.

It should be noted that the operations described in the methods of FIGS. 2 and 3 can be performed in a different order than shown and/or simultaneously (partially or completely) with other operations, where appropriate. In some implementations, operations can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

FIGS. 4A-8 are diagrammatic illustrations of example images processed using one or more features described herein in order to provide a vignette visual image effect for the images. In various implementations, the images can be displayed on a display device, e.g., of a client device 120, 122, 124, and/or 126 of FIG. 1, or a server system 102 in some implementations. In other implementations, the images can be processed as described herein without being displayed, or being displayed after all processing is complete. In one non-limiting example, a user can view any of images displayed in an interface on a client device.

Figure 4A:
FIGS. 4A-8 are diagrammatic illustrations of examples images and vignette effects provided for the images, according to some implementations.
Figure 4B:

FIG. 4A shows an image 400 including a number of faces. Detected faces are shown having boxes drawn around them, e.g., face boxes as provided by a facial recognizer (faces in the image not having a box were not identified by the facial recognizer in this example). The detected faces include two foreground faces (the largest faces in the image) and four background faces. However, only the two foreground faces were found to be important faces of the image due to their larger size and/or more central location, so the center of the vignette effect is determined between these two important faces. In FIG. 4B, a vignette border effect has been applied to image 400 using one or more features described herein (the darkness of the vignette shown may be exaggerated for explanatory purposes in some example figures referenced herein). The vignette is shown having a gradual darkening of the image outside the two important faces, where more darkening is provided on the left side of the image since the center of the vignette is located more toward the right of the image center.

Figure 5A:
Figure 5B:
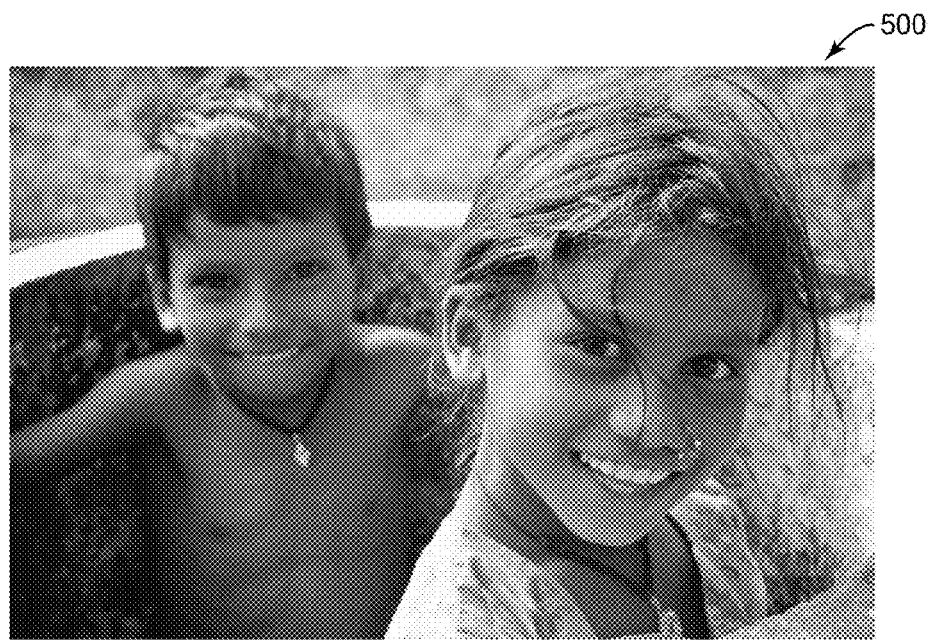

FIG. 5A shows an image 500 including two detected faces having boxes drawn around them as provided by a facial recognizer. In this example, the two faces are determined to be important faces. In FIG. 5B, a vignette effect has been applied to image 500 using one or more features described herein. Since the two faces are close to the edges of the photo, the radius is large and little darkening has been applied to the image near the borders by the vignette effect. The left border area of the image may be darker than the right border area, indicating an effect center that has been weighted to the right due to the larger size of the face on the right.

Figure 6A:
Figure 6B:

FIG. 6A shows an image 600 including a number of faces, including three detected faces having boxes drawn around them as determined by a facial recognizer. In this example, larger faces have been found to be the most important. However, two of the faces are blurred which reduces their importance, such that only the second face from the right is considered important in this example. In FIG. 6B, a vignette effect has been applied to the image 600 using one or more features described herein. The vignette is centered on the important face, causing the effect center to be closer to the right image border and the left side of the image to be made darker with the vignette.

Figure 7A:
Figure 7B:

FIG. 7A shows an image 700 including two important faces that have been recognized by the facial recognizer and have boxes drawn around them. In FIG. 7B, a vignette effect has been applied to the image 700 using one or more features described herein. In this example, the two identified important faces are positioned within a predefined, confined central area of the image, allowing the vignette strength to be increased so that the vignette can be made darker. The vignette center, which is the mean of the two box centers, is close to the center of the image, which can allow the vignette effect to be applied on all sides of the image around the central faces (the vignette effect on the right area of the image may appear reduced here due to the brightness of that area).

Figure 8:
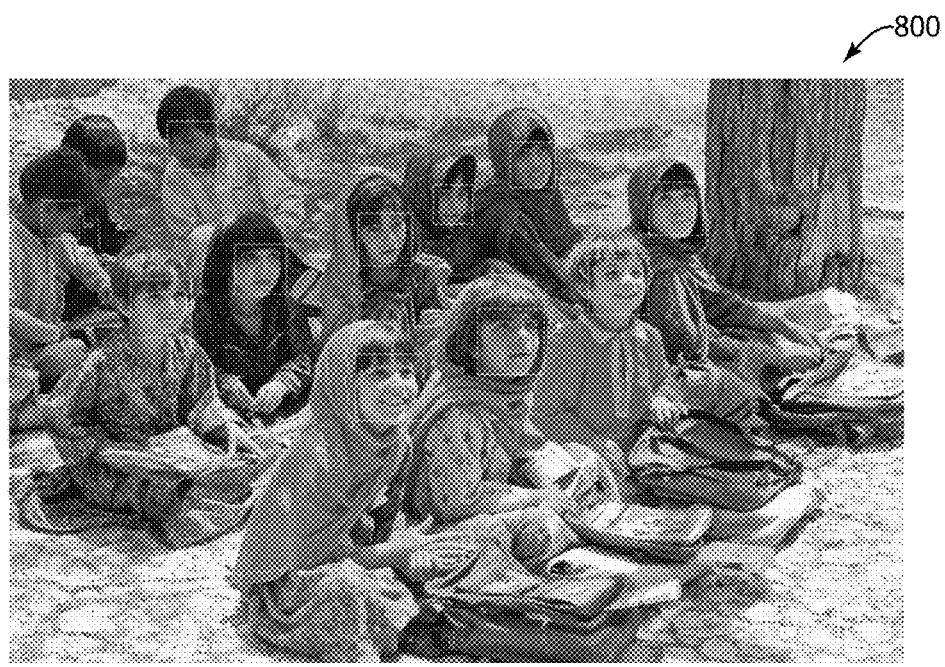

FIG. 8 shows an example image 800 including several faces. The facial recognizer has detected the faces indicated by the boxes. The size of the faces are relatively small compared to the size of the image and are similarly-sized to each other, and their locations are spread over a large area of the image (e.g., more than a predetermined percentage of the image area). In some implementations, none of the faces may be found to be important since they are too small compared to overall image size. This would cause no vignette to be applied to the image 800. In some implementations, if faces were found to be important, most faces are similar in size such that most of the faces would be considered important. The important faces are located outside a constrained central area, e.g., one or more of the faces are close to the borders of the image, thus preventing a vignette from being applied in some implementations since some of the important faces would be darkened by the vignette effect. A goal of the vignette effect is to direct attention to the center of the vignette effect, which is not as suitable for image 800 due to important faces being spread far from the image center.

Figure 9:
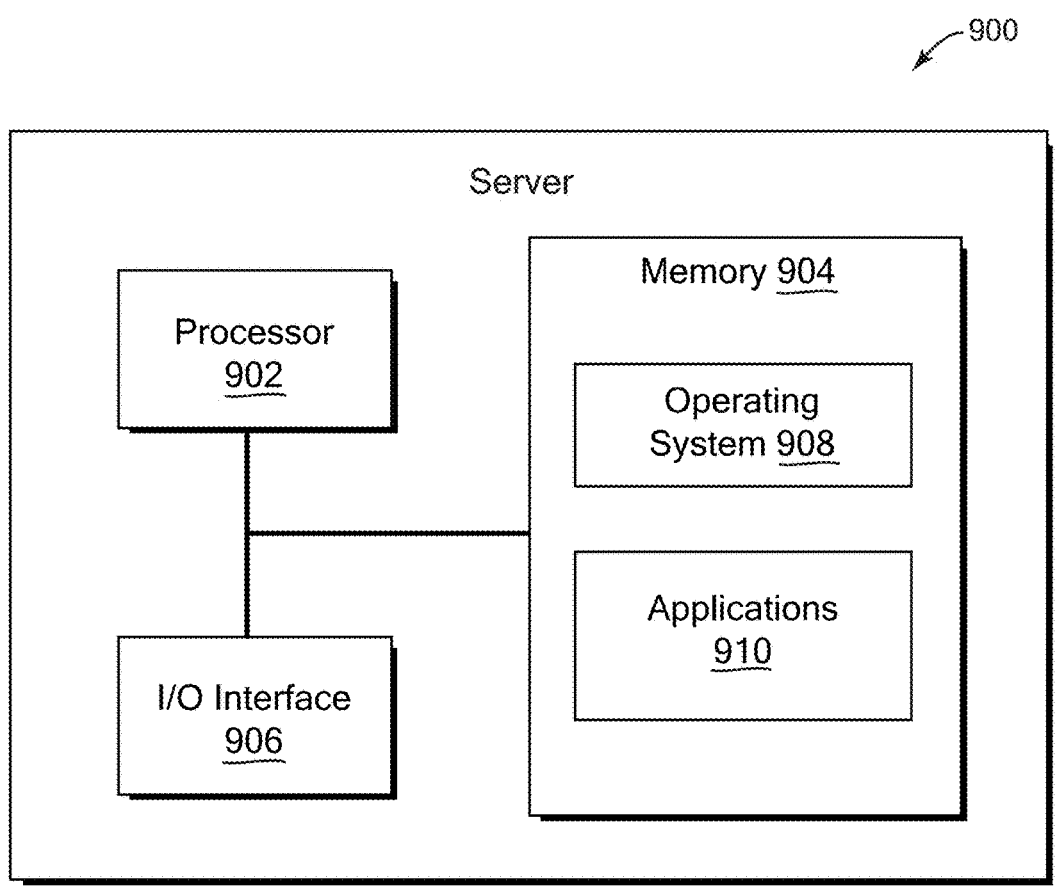
FIG. 9 is a block diagram of an example device which may be used for one or more implementations described herein.

FIG. 9 is a block diagram of an example device 900 which may be used to implement one or more implementations described herein. In one example, device 900 may be used to implement server device 104 of FIG. 1, and perform appropriate method implementations described herein. Server device 900 can be any suitable computer system, server, or other electronic or hardware device. For example, the server device 900 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 900 includes a processor 902, a memory 904, and input/output (I/O) interface 906.

Processor 902 can be one or more processors or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908 and one or more applications engines 910 such as a graphics editing engine, web hosting engine, social networking engine, etc. In some implementations, the applications engines 910 can include instructions that enable processor 902 to perform the functions described herein, e.g., some or all of the methods of FIGS. 2 and 3. Any of software in memory 904 can alternatively be stored on any other suitable storage location or computer-readable medium. In addition, memory 904 (and/or other connected storage device(s)) can store images, visual effect parameters, and other data used in the features described herein. Memory 904 and any other type of storage (magnetic disk, optical disk, magnetic tape, or other tangible media) can be considered "storage devices."

I/O interface 906 can provide functions to enable interfacing the server device 900 with other systems and devices. For example, network communication devices, storage devices such as memory and/or database 106, and input/output devices can communicate via interface 906. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, server device 900 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 900, such as processor(s) 902, memory 904, and I/O interface 906. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in and/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method comprising:
   identifying a plurality of important objects in an image, wherein the plurality of important objects are determined to individually have an importance measurement satisfying a predetermined threshold indicating importance to a viewer of the image;
   determining outermost objects of the plurality of important objects;
   determining a distance between the outermost objects;
   determining a level of suitability of applying a visual border effect to the image based on the plurality of important objects and the distance between the outermost objects;
   determining a centering location in the image to position the visual border effect based on determining an average center from the respective centers of each of the plurality of important objects;
   determining a strength of the visual border effect and a radius in the image for below a minimum threshold effect; and
   applying the visual border effect to the image extending to or near borders of the image, according to the level of suitability, the strength, the centering location, and the radius.

2. The method of claim 1 wherein the plurality of important objects are important faces.

3. The method of claim 1 wherein the radius is unaffected by the visual border effect.

4. The method of claim 1 wherein the visual border effect is a vignette.

5. The method of claim 1 wherein the importance measurement includes a determination of whether an object has a size greater than a predetermined size, where the predetermined size is based on a size of the image.

6. The method of claim 1 wherein the importance measurement includes a determination of whether an object has a sharpness over a predetermined threshold sharpness.

7. The method of claim 1 further comprising determining a strength of darkening of the visual border effect.

8. The method of claim 7 wherein the strength of the darkening is based on at least one of:
   a location of one of more of the plurality of important objects in the image,
   a combined size of the plurality of important objects in the image, and
   number of the plurality of important objects in the image.

9. A computer implemented method comprising:
   identifying a plurality of important objects in an image, wherein the plurality of important objects are determined to have an importance measurement satisfying a predetermined threshold indicating importance to a viewer of the image;
   determining a distance between the plurality of important objects;
   determining whether to apply a visual border effect to the image based on the distance between the plurality of important objects;
   in response to determining that the visual border effect is to be applied, determining a centering location in the image for a center of a visual border effect to be centered, wherein the centering location is based on an average center of the plurality of important objects in the image;
   determining a strength of the visual border effect and a radius in the image for below a minimum threshold effect; and
   applying the visual border effect to the image extending to or near borders of the image, according to the strength, the centering location, and the radius, wherein the visual border effect is applied in greater strength closer to the borders of the image than towards the centering location.

10. A system comprising:
    a storage device; and
    at least one processor accessing the storage device and operative to perform operations comprising:
    identifying a plurality of important objects in an image, wherein the plurality of important objects are determined to individually have an importance measurement satisfying a predetermined threshold indicating importance to a viewer of the image;
    determining outermost objects of the plurality of important objects;
    determining a distance between the outermost objects;
    determining a level of suitability of applying a visual border effect to the image based on the plurality of important objects and the distance between the outermost objects;
    determining a centering location in the image to position the visual border effect based on determining an average center from the respective centers of each of the plurality of important objects;
    determining a strength of the visual border effect and a radius in the image for below a minimum threshold effect; and
    applying the visual border effect to the image extending to or near borders of the image, according to the level of suitability, the strength, the centering location, and the radius.

11. The computer implemented method of claim 9 wherein the visual border effect is a vignette.

12. The system of claim 10 wherein the visual border effect is a vignette.

13. The computer implemented method of claim 9 further comprising determining a strength of darkening of the visual border effect, wherein the strength of the darkening is based on at least one of:
    a location of one of more of the plurality of important objects in the image,
    a combined size of the plurality of important objects in the image, and
    number of the plurality of important objects in the image.

14. The system of claim 10 wherein the operations further comprise determining a strength of darkening of the visual border effect, wherein the strength of the darkening is based on at least one of:
    a location of one of more of the plurality of important objects in the image,
    a combined size of the plurality of important objects in the image, and
    number of the plurality of important objects in the image.

* * * * *